May 15, 1928. 1,670,267
J. MAYES
LINE AND SURFACE LEVEL
Filed Sept. 20, 1926
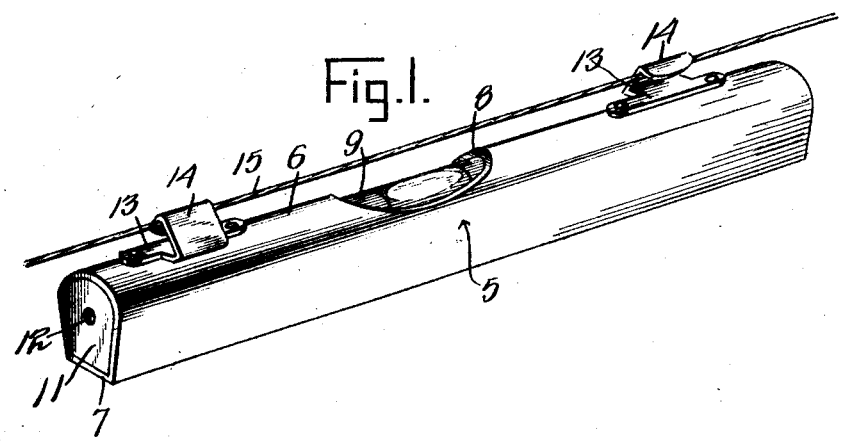
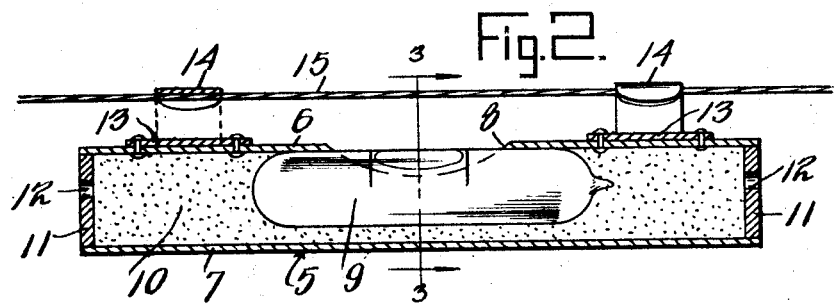
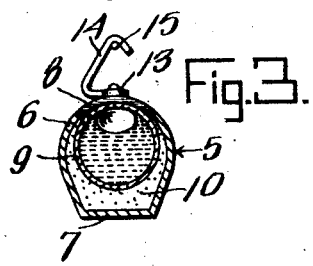
Inventor
John Mayes Patented May 15, 1928.

1,670,267

UNITED STATES PATENT OFFICE.

JOHN MAYES, OF PORT AUSTIN, MICHIGAN, ASSIGNOR TO MAYES BROTHERS TOOL MANUFACTURING COMPANY, OF PORT AUSTIN, MICHIGAN, A CORPORATION OF MICHIGAN.

LINE AND SURFACE LEVEL.

Application filed September 20, 1926. Serial No. 136,677.

My said invention relates to a combined line and surface level and it consists in various improvements in its form and in the details of construction, whereby a level of this character is provided possessing various advantages in construction and use, all as will be hereinafter more fully described and claimed.

Referring to the accompanying drawing which forms a part thereof and in which like numerals designate similar parts in the several views:

Figure 1 is a perspective view of a level shown supported by a guide line,

Figure 2, a vertical longitudinal section therethrough, and,

Figure 3, a vertical section on the line 3—3 of Fig. 2.

In said drawings the portion marked 5 indicates the casing, which is preferably formed of metal with an oval or segmental top 6 and a flat bottom 7 with tapered sides connecting said top and bottom. Midway of the top portion 6, an opening 8 is provided through which is visible a spirit tube 9 mounted within the casing 5 against said upper portion and held in place by a plastic material 10 such as plaster Paris.

The ends of casing 5 are closed by close fitting plates 11 each provided with a small opening 12 for the insertion of the hooked end of an instrument for removing them. Riveted to the upper portion 6, adjacent the ends of the casing 5, are the bases 13 of oppositely positioned or directed supporting hooks 14 adapted to engage a guide line 15 as shown. As will be observed the rivets by which said hooks 14 are secured extend through the upper portion 6 only, thus providing unobstructed access to the interior of casing 5 through its ends when opened by removing one or the other of plates 11, whereby the spirit tube 9 may be removed and replaced for any reason such as breakage, or for adjustment or repair.

By forming said instrument with the flat bottom surface 11 it is adapted, as will be readily understood, to be used as a surface level and by means of the hooks 14, attached to its top, it is adapted to be used as a line level. By reason of the hooks 14 being directed in reverse directions the liability of the instrument being accidentally detached from the line is greatly lessened. By reason of the casing being free of any permanent obstruction and having removable ends means is provided for convenient and ready replacement of a broken spirit tube as well as for the adjustment of said tube should it by any means become disarranged from its bed in the plastic material.

It will be obvious to those skilled in the art, that various changes may be made in the form and proportions of my invention without departing from the spirit thereof, and therefore I do not limit myself to what is shown in the drawings and described in the specification, but only as indicated in the appended claim.

Having thus fully described my said invention, what I claim as new and desire to secure by Letters Patent, is:

A combined line and surface level comprising a substantially smooth tube-like open-ended body, having an arched or curved top and a flat base, hooks secured in spaced relation to said arched top adjacent each end of the same for engaging a guide line, a removable apertured cap for each end of said body, a spirit tube mounted in the arched upper portion of the body and fitting snugly against the inner arched wall of the same, plastic material supporting said spirit tube, said apertures serving for ready removal of said caps, thus affording free access to the interior of the body, substantially as set forth.

In witness whereof, I have hereunto set my hand at Port Austin, Michigan, this 16th day of September, A. D. nineteen hundred and twenty-six.

JOHN MAYES.